(12) United States Patent
Wang et al.

(10) Patent No.: US 11,322,074 B2
(45) Date of Patent: May 3, 2022

(54) DATA TRANSMISSION METHOD AND DEVICE, DISPLAY DEVICE

(71) Applicants: Chengdu BOE Optoelectronics Technology Co., Ltd., Chengdu (CN); BOE TECHNOLOGY GROUP CO., LTD., Beijing (CN)

(72) Inventors: Chang Wang, Beijing (CN); Tiegang Wang, Beijing (CN); Hui Zhang, Beijing (CN); Xiao Ma, Beijing (CN); Qianqian Liu, Beijing (CN); Bin Zhang, Beijing (CN)

(73) Assignees: Chengdu BOE Optoelectronics Technology Co., Ltd., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/770,722

(22) PCT Filed: Dec. 24, 2019

(86) PCT No.: PCT/CN2019/127933
§ 371 (c)(1),
(2) Date: Jun. 8, 2020

(87) PCT Pub. No.: WO2020/143444
PCT Pub. Date: Jul. 16, 2020

(65) Prior Publication Data
US 2021/0225259 A1 Jul. 22, 2021

(30) Foreign Application Priority Data
Jan. 11, 2019 (CN) .......................... 201910028180.7

(51) Int. Cl.
G09G 3/00 (2006.01)
G09G 3/20 (2006.01)
G06T 1/60 (2006.01)

(52) U.S. Cl.
CPC ............ *G09G 3/2096* (2013.01); *G06T 1/60* (2013.01); *G09G 2320/0242* (2013.01)

(58) Field of Classification Search
None
See application file for complete search history.

(56) References Cited

U.S. PATENT DOCUMENTS 6,233,062 B1 * 5/2001 Takamatsu ........... H04N 1/3877
358/461
7,586,631 B2 * 9/2009 Omori ....................... G06T 5/00
358/1.15
(Continued)

FOREIGN PATENT DOCUMENTS

CN 101610464 A 12/2009
CN 102103834 A 6/2011
(Continued)

OTHER PUBLICATIONS

International Search Report and Written Opinion dated Mar. 12, 2020 for PCT Patent Application No. PCT/CN2019/127933.
(Continued)

*Primary Examiner* — Martin Mushambo
(74) *Attorney, Agent, or Firm* — Thomas | Horstemeyer, LLP

(57) ABSTRACT

A data transmission method comprises: receiving and storing image data, wherein the image data comprises first data and second data, the first data is encrypted verification data, and the second data is original data; comparing the first data
(Continued)

with the second data in stored image data; replacing the second data with the first data, if the second data and the first data are inconsistent.

12 Claims, 5 Drawing Sheets

(56) References Cited

U.S. PATENT DOCUMENTS

| | | | | |
|---|---|---|---|---|
| 2002/0093699 A1* | 7/2002 | Masao | ............... | H04N 1/00236 |
| | | | | 358/519 |
| 2003/0059123 A1* | 3/2003 | Omori | ...................... | G06T 5/00 |
| | | | | 382/254 |
| 2004/0150641 A1* | 8/2004 | Duiker | ................... | G06T 15/20 |
| | | | | 345/426 |
| 2004/0174554 A1* | 9/2004 | Lee | ......................... | H04N 1/41 |
| | | | | 358/1.13 |
| 2005/0062856 A1* | 3/2005 | Matsushita | ............ | H04N 1/624 |
| | | | | 348/222.1 |
| 2007/0182671 A1* | 8/2007 | Nathan | ................. | H05B 45/10 |
| | | | | 345/76 |
| 2007/0269120 A1* | 11/2007 | Thiems | ................... | G06T 9/001 |
| | | | | 382/238 |
| 2009/0034717 A1* | 2/2009 | Giraud | ................. | H04L 9/3236 |
| | | | | 380/28 |
| 2010/0074322 A1* | 3/2010 | Terashima | ........... | H04N 19/428 |
| | | | | 375/240.01 |
| 2010/0141733 A1* | 6/2010 | Borchers | ............ | H04N 5/23206 |
| | | | | 348/36 |
| 2010/0241316 A1* | 9/2010 | Uehira | ................ | B60R 21/0136 |
| | | | | 701/45 |
| 2012/0047339 A1* | 2/2012 | Decasper | ............ | G06F 11/1076 |
| | | | | 711/162 |
| 2012/0147045 A1* | 6/2012 | Oike | ..................... | G06F 3/0483 |
| | | | | 345/634 |
| 2012/0268798 A1 | 10/2012 | Kohara | | |
| 2013/0207998 A1* | 8/2013 | Aoki | ........................ | G09G 5/00 |
| | | | | 345/619 |
| 2013/0250138 A1* | 9/2013 | Safai | .................. | H04N 9/04557 |
| | | | | 348/223.1 |
| 2013/0254441 A1* | 9/2013 | Kipnis | ................ | H03M 7/3071 |
| | | | | 710/68 |
| 2014/0101485 A1* | 4/2014 | Wegener | ............. | H03M 7/3068 |
| | | | | 714/32 |
| 2014/0321764 A1* | 10/2014 | Zarom | ................. | H04N 19/593 |
| | | | | 382/243 |
| 2016/0125806 A1* | 5/2016 | Nathan | ................ | G09G 3/3685 |
| | | | | 345/691 |
| 2016/0132744 A1* | 5/2016 | Choi | ......................... | G06T 7/12 |
| | | | | 382/173 |
| 2016/0284273 A1* | 9/2016 | Ma | ........................ | G09G 3/3233 |
| 2016/0357668 A1* | 12/2016 | Renes | .................... | G06F 9/462 |
| 2017/0257645 A1* | 9/2017 | Thiagarajan | ............ | G10L 19/00 |
| 2018/0144506 A1* | 5/2018 | Lee | ........................ | G06T 11/001 |
| 2020/0241774 A1* | 7/2020 | Mendiola | ................ | H04L 67/34 |
| 2021/0173824 A1* | 6/2021 | Chen | .................... | H03M 7/3044 |

FOREIGN PATENT DOCUMENTS

| | | |
|---|---|---|
| CN | 103473254 A | 12/2013 |
| CN | 104202166 A | 12/2014 |
| CN | 105577631 A | 5/2016 |
| CN | 105975240 A | 9/2016 |
| CN | 106648955 A | 5/2017 |
| CN | 107920050 A | 4/2018 |
| CN | 108958966 A | 12/2018 |
| CN | 109587557 A | 4/2019 |
| CN | 106648955 B | 1/2020 |
| JP | 2010068145 A | 3/2010 |

OTHER PUBLICATIONS

1st Office Action dated Mar. 3, 2020 for Chinese Patent Application No. 201910028180.7.

2nd Office Action dated Nov. 23, 2020 for Chinese Patent Application No. 201910028180.7.

* cited by examiner

DATA TRANSMISSION METHOD AND DEVICE, DISPLAY DEVICE

CROSS REFERENCE TO RELATED APPLICATIONS

The present application is based on International Application No. PCT/CN2019/127933, filed on Dec. 24, 2019, which is based upon, and claims the benefit of and priority to Chinese Patent Application No. 201910028180.7, filed on Jan. 11, 2019, the entire contents of which being incorporated by reference in their entireties herein.

TECHNICAL FIELD

The present disclosure relates to the field of display technology and, in particular, to a data transmission method and device, and a display device.

BACKGROUND

With the development and progress of technology, applications of Random Access Memory (RAM) in various electronic products are becoming more and more extensive. In order to ensure the performance of RAM, RAM is usually tested. However, due to limitations of existing detection technology, some failures in the RAM may not be thoroughly detected, which may cause errors in data transmission.

For example, transistors in a RAM cell in an Active-Matrix Organic Light-Emitting Diode (AMOLED) drive circuit may have various failures, such as instability, high or low turn-on voltage, etc., which may not be detected by common Built-In Self-Test (BIST) or Cyclic Redundancy Check (CRC). However, when a RAM storage unit has the above-mentioned failures, it may cause the display screen to become locally discolored.

It should be noted that the information disclosed in the above Background section is only for enhancing the understanding of the background of the present disclosure, and therefore, may include information that does not constitute prior art known to those of ordinary skill in the art.

SUMMARY

According to an aspect of the present disclosure, a data transmission method is provided, and the data transmission method includes:
 receiving and storing image data, wherein, the image data includes first data and second data, the first data is encrypted verification data, and the second data is original data;
 comparing the first data with the second data in stored image data;
 replacing the second data with the first data, if the second data and the first data are inconsistent.

According to an embodiment of the present disclosure, the comparing the first data with the second data in the stored image data, includes:
 decoding the first data;
 comparing decoded first data with the second data.

According to an embodiment of the present disclosure, the comparing the first data with the second data in the stored image data, includes:
 encrypting the second data, wherein an encryption method of the second data is same as an encryption method of the first data;
 comparing encrypted second data with the first data.

According to an embodiment of the present disclosure, before the receiving and storing the image data, the method further includes:
 comparing the first data with the second data;
 replacing the second data with the first data, if the second data and the first data are inconsistent.

According to an embodiment of the present disclosure, after the replacing the second data with the first data, if the second data and the first data are inconsistent, the method further includes:
 storing replaced image data.

According to a second aspect of the present disclosure, there is also provided a data transmission device, and the data transmission device includes:
 a first storage unit, configured to receive and store image data, wherein, the image data includes first data and second data, the first data is encrypted verification data, and the second data is original data;
 a first correction unit, connected to the first storage unit, and configured to compare the first data with the second data in stored image data and replace the second data with the first data, if the second data and the first data are inconsistent.

According to an embodiment of the present disclosure, the data transmission device further includes:
 a second correction unit connected to the first storage unit, and configured to detect the first data and the second data in the image data at an input end of the first storage unit and replace the second data with the first data, if the second data and the first data are inconsistent.

According to an embodiment of the present disclosure, the first correction unit includes:
 a decoder configured to verify the first data and the second data in the first storage unit and replace the second data with the first data, if the second data and the first data are inconsistent;
 the second correction unit includes:
 a decoder configured to verify the first data and the second data at the input end of the first storage unit, and replace the second data with the first data, if the second data and the first data are inconsistent.

According to a third aspect of the present disclosure, there is provided a display device including the above-mentioned data transmission device.

It should be understood that the above general description and the following detailed description are only exemplary and explanatory, and do not limit the present disclosure.

BRIEF DESCRIPTION OF THE DRAWINGS

The drawings herein are incorporated into and constitute a part of this specification, show embodiments consistent with this disclosure, and are used together with the specification to explain the principles of this disclosure. Understandably, the drawings in the following description are only some embodiments of the present disclosure. For those of ordinary skill in the art, without paying any creative work, other drawings may be obtained based on these drawings.

DETAILED DESCRIPTION

Figure 1:
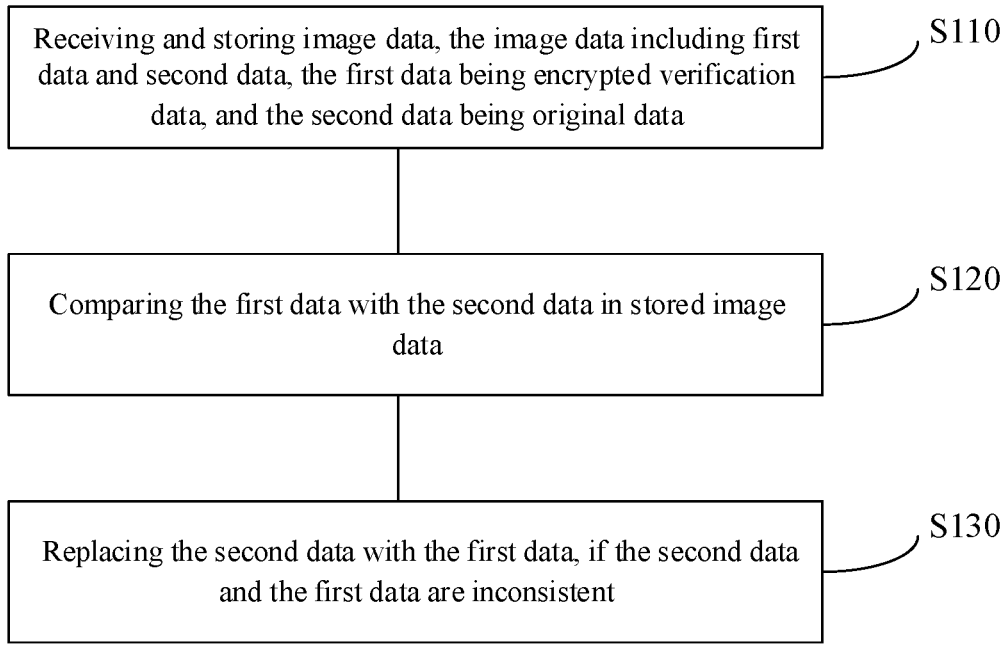
FIG. 1 is a flowchart of a first data transmission method provided by an exemplary embodiment of the present disclosure.

Example embodiments will now be described more fully with reference to the drawings. However, the example embodiments may be implemented in various forms, and should not be construed as being limited to the embodiments set forth herein; on the contrary, providing these embodiments enables the present invention to be comprehensive and complete, and fully convey the idea of the example embodiments for those skilled in the art. The same reference numerals in the drawings denote the same or similar structures, and thus their detailed description will be omitted.

Although relative terms are used in this specification, such as "up" and "down," to describe the relative relationship between one component of an icon and another component, these terms are used in this specification only for convenience, for example, according to the direction of the example described. It may be understood that if the icon device is turned upside down, the component described as "upper" will become the component under "lower". When a structure is "on" another structure, it may mean that the structure is integrally formed on the other structure, or that the structure is "directly" arranged on the other structure, or that the structure is "indirectly" arranged on the other structure through another structure.

The terms "a", "an", "the", "said", and "at least one" are used to indicate the presence of one or more elements/components/etc.; the terms "including" and "having" are intended to mean an open-ended inclusion and mean that there may be additional elements/components/etc. in addition to the listed elements/components/etc.; the terms "first", "second", etc. are only used as marks, not to limit the number of objects.

In the related art, in the design and manufacture of wafers, there are usually tens in one million of NG products that may not be detected. The NG product refers to an unstable metal-oxide-semiconductor (MOS) tube in a RAM storage unit, or the MOS tube has a high or low turn-on voltage. When a drive circuit has the above-mentioned faults, there is a risk that the display screen will be locally blurred. For example, for an integrated circuit (IC) with a resolution of 1440×2880, there are more than 33 million memory cells in the RAM. As long as there is a problem with one memory cell, a large dot-matrix screen such as Quarter High Definition (QHD, that is, quarter resolution of full HD screen) that needs to be compressed may be locally discolored, and it may not be detected in a general environment. In some special environments, it may cause the display screen to become locally discolored.

An embodiment of the present disclosure first provides a data transmission method. As shown in FIG. 1, the data transmission method includes the following steps:

In Step S110, the image data is received and stored, where the image data includes first data and second data, the first data is encrypted verification data, and the second data is original data;

In Step S120, the first data is compared with the second data in the stored image data; and In Step S130, the second data is replaced with the first data if the second data and the first data are inconsistent.

The data transmission method provided by the present disclosure is used to transmit image data and verify original second data through encrypted first data. Since the first data is encrypted data, it will not cause errors during transmission and storage due to transmission or storage failure. When the second data has an error due to transmission or storage failure, the error may be determined by comparing the first data with the second data, and the second data is replaced by the first data, thereby ensuring the accuracy of the data, avoiding a phenomenon that a display screen is locally discolored due to failures of a RAM storage unit in a driving circuit, and improving the display quality.

The data transmission method provided by the embodiments of the present disclosure will be described in detail below:

In Step S110, image data may be received and stored. The image data includes the first data and the second data, the first data is encrypted verification data, and the second data is original data.

The RAM storage unit in the drive circuit receives the image data and stores the image data. The image data may be image data transmitted from an Application Processor (AP) end of a terminal device, such as a mobile phone or a tablet, to the RAM storage unit in an integrated drive circuit. The AP end compresses the image data, and then transmits the image data. The image data includes the first data and the second data, and the first data may be the same as the second data. The first data may be encrypted by data encryption technology, thereby ensuring that the first data will not cause data errors due to transmission or storage failure during transmission and storage. The second data is transmitted and stored using conventional techniques during transmission and storage.

In Step S120, the first data and the second data in the stored image data may be compared.

Figure 2:
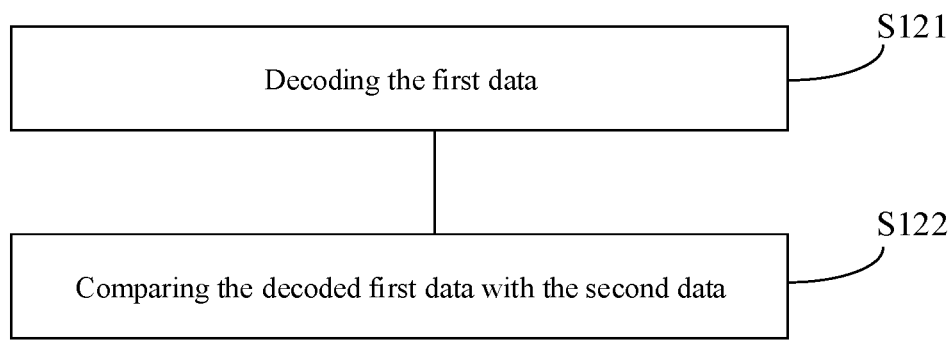
FIG. 2 is a flowchart of a data correction method provided by an exemplary embodiment of the present disclosure.

In a feasible implementation manner provided by an embodiment of the present disclosure, as shown in FIG. 2, comparing the first data with the second data in the stored image data may include the flowing steps.

In Step S121, the first data is decoded;

In Step S122, the decoded first data is compared with the second data; and

In Step S110, the image data is stored in the RAM storage unit. If there is a failure in the RAM storage unit, the second data in the image may generate an error due to the failure, which may cause subsequent data errors in the drive circuit. However, in the related art, the error may not be detected. After the erroneous image data is transmitted to a timing control unit, an erroneous driving signal is generated, which in turn causes the display screen to become locally discolored. In the embodiment of the present disclosure, the encrypted first data is decoded, and then the decoded first data and the second data are compared to detect whether the second data and the decoded first data are consistent. If the second data is consistent with the decoded first data, it may be determined that there is a failure in the RAM storage unit used to store the data; if the second data is inconsistent with the decoded first data, it may be determined that there is no failure in the RAM storage unit that stores the data.

Figure 3:
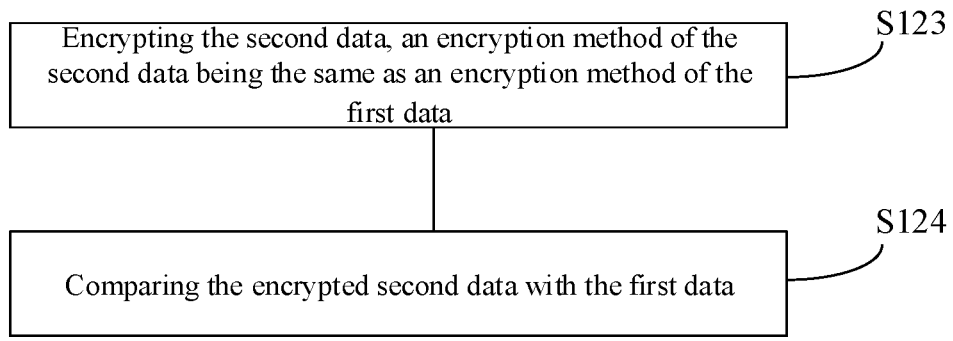
FIG. 3 is a flowchart of another data correction method provided by an exemplary embodiment of the present disclosure.

In another feasible embodiment provided by the present disclosure, as shown in FIG. 3, comparing the first data with the second data in the stored image data may include the flowing steps.

In Step S123, the second data is encrypted, wherein an encryption method of the second data is the same as an encryption method of the first data;

In Step S124, the encrypted second data is compared with the first data.

Since the first data will be partially lost during the encryption and decoding of the first data, in order to avoid errors in the comparison result generated by partial loss of the first data during the encryption and decoding process. By encrypting the second data, the encrypted second data may be compared with the first data to detect whether the encrypted second data is consistent with the first data. If the second data is consistent with the first data, it may be determined that there is a failure in the RAM storage unit used to store the data, and if the second data is inconsistent with the first data, it may be determined that there is no failure in the RAM storage unit storing the data.

It should be noted that the above-mentioned loss of image data during the encryption and decoding process is within an acceptable error range of the display effect, that is, during the encryption or decoding process, the partial loss of image data does not affect the display effect of the display.

In Step S130, if the second data and the first data are inconsistent, the second data is replaced by the first data.

When the decoded first data and the decoded second data are compared in a manner provided in Step S121 and Step S122, the first data may be partially lost due to encryption and decoding process. Therefore, when comparing the first data with the second data, if a difference between the first data and the second data is within a range of partially lost data, it is determined that the first data and the second data are consistent, and there is no failure in the RAM storage unit storing the image data, and in this case, the image data will be transmitted to a decompression unit for decompression; when the difference between the first data and the second data exceeds the range of the partially lost data, it is determined that the first data and the second data are inconsistent, and there is a failure in the RAM storage unit storing the image data, and in this case, the second data is replaced by the first data to correct the image data.

When the first data and the encrypted second data are compared by the methods provided in Step S123 and Step S124, since the encryption method of the second data is the same as the encryption method of the first data, if there is no failure in the RAM storage unit during comparison, the encrypted second data is consistent with the first data. Of course, in actual applications, when the difference between the first data and the second data is within an allowable error that does not affect the display effect, it may also be determined that the first data and the second data are consistent. When the first data and the second data are consistent, the image data will be transferred to the decompression unit for decompression; when the first data and the second data are inconsistent, there is a failure in the RAM storage unit that stores the image data. In this case, the first data is decoded, and the second data is replaced by the first data to correct the image data.

Figure 4:
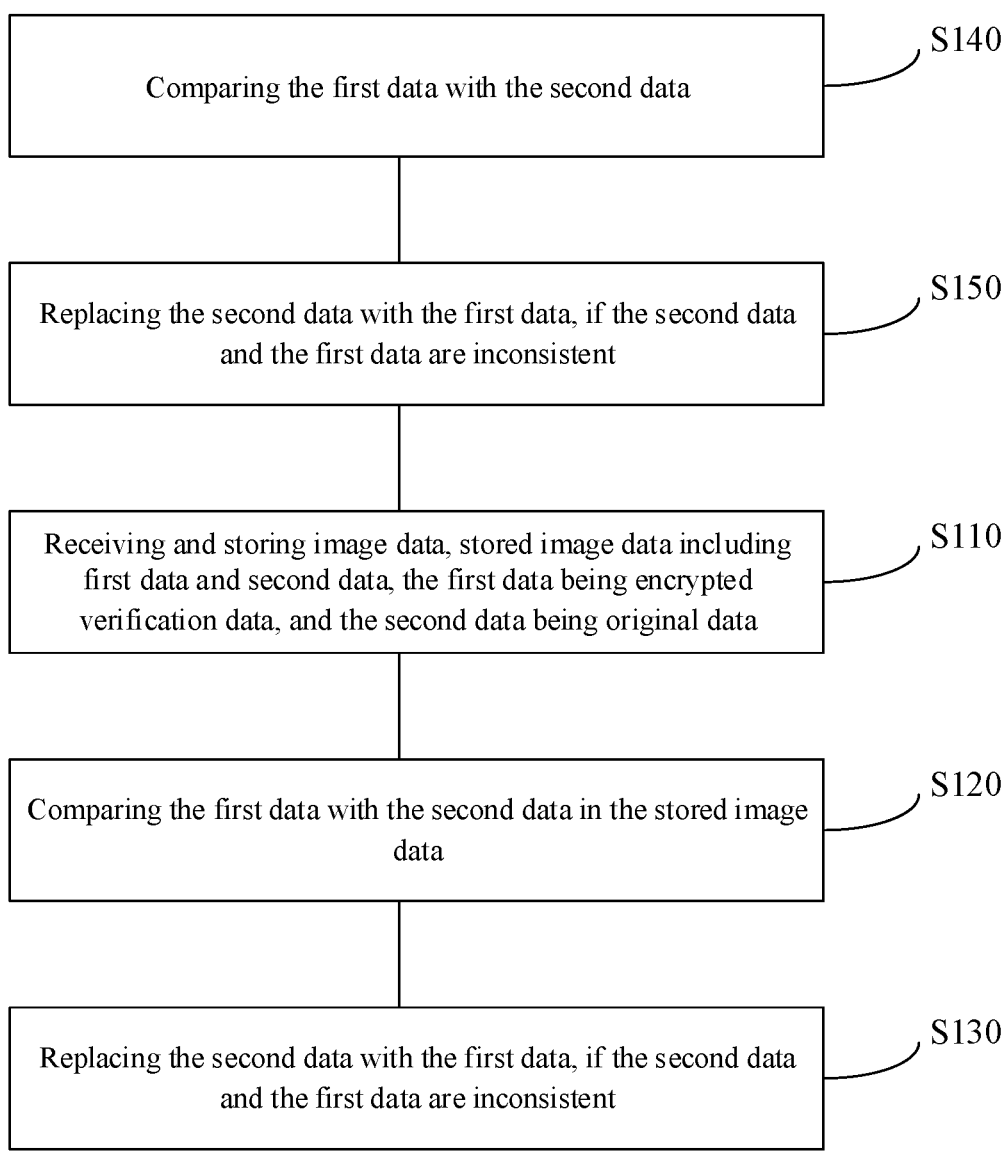
FIG. 4 is a flowchart of a second data transmission method provided by an exemplary embodiment of the present disclosure.

Further, since the image data is transferred from the AP end of the terminal to the RAM storage unit of the driving integrated circuit, in order to avoid the error of the image data stored in the RAM storage unit during the previous transmission process, as shown in FIG. 4, before receiving and storing the image data, the data transmission method provided by the embodiment of the present disclosure may further include the following steps.

In Step S140, the first data is compared with the second data;

In Step S150, the second data is replaced with the first data, if the second data and the first data are inconsistent.

By correcting the image data before image data is stored in the RAM unit, a problem of misjudgment of the RAM storage unit due to errors in the image data due to transmission errors is avoided.

In a feasible implementation manner provided by an embodiment of the present disclosure, the comparing the first data with the second data may include:

decoding the first data; comparing the decoded first data with the second data.

The encrypted first data is decoded, and then the decoded first data and the second data are compared to detect whether the second data and the decoded first data are consistent. If the second data is consistent with the decoded first data, it may be determined that there is no error in the image data during transmission, and the image data is stored in the corresponding RAM storage unit; if the second data and the decoded first data are inconsistent, it may be determined that there is an error in the image data during transmission.

In another feasible embodiment provided by the present disclosure, comparing the first data and the second data may include: encrypting the second data, wherein the second data is encrypted in a same manner as the first data; and comparing the compressed second data with the first data.

In a process of encrypting and decoding the first data, the first data may be partially lost. In order to avoid an error in the comparison result generated by the partial loss of the first data in the process of encryption and decoding. The encrypted second data may be compared with the first data by encrypting the second data to detect whether the encrypted second data is consistent with the first data. If the second data is consistent with the first data, it may be determined that there is no error in the image data during transmission, and the image data is stored in the corresponding RAM storage unit; if the second data is inconsistent with the first data, it may be determined that there is a failure in the RAM storage unit storing the data.

It should be noted that the above-mentioned loss of image data during the encryption and decoding process is within the acceptable error range of the display effect, that is, during the encryption or decoding process, the partial loss of the image data does not affect the display effect of the display.

In Step S150, if the second data and the first data are inconsistent, the second data is replaced by the first data.

When the first data is decoded and the first data and the second data are compared, the first data may be partially lost during the encryption and decoding process. Therefore, when comparing the first data with the second data, when a difference between the first data and the second data is within a range of partially lost data, it is determined that the first data and the second data are consistent, and there is no error in the image data during transmission, and in this case, the image data will be stored in the corresponding RAM storage unit; when the difference between the first data and the second data exceeds the range of the partially lost data, it is determined that the first data and the second data are inconsistent, and there is an error in the image data during transmission, and in this case, the second data is replaced by the first data to correct the image data.

When encrypting the second data and comparing the first data with the encrypted second data, since the encryption method of the second data is the same as the encryption method of the first data, during comparison, if there is no error in the image data during transmission, the encrypted second data is consistent with the first data. Of course, in actual applications, when the difference between the first data and the second data is within an allowable error that does not affect the display effect, it may also be determined that the first data and the second data are consistent. When the first data and the second data are consistent, the image data will be transferred to the corresponding RAM storage unit; when the first data and the second data are inconsistent, there is an error in the image transmission process, and in this case, the first data is decoded, and the second data is replaced by the first data to correct the image data.

Figure 5:
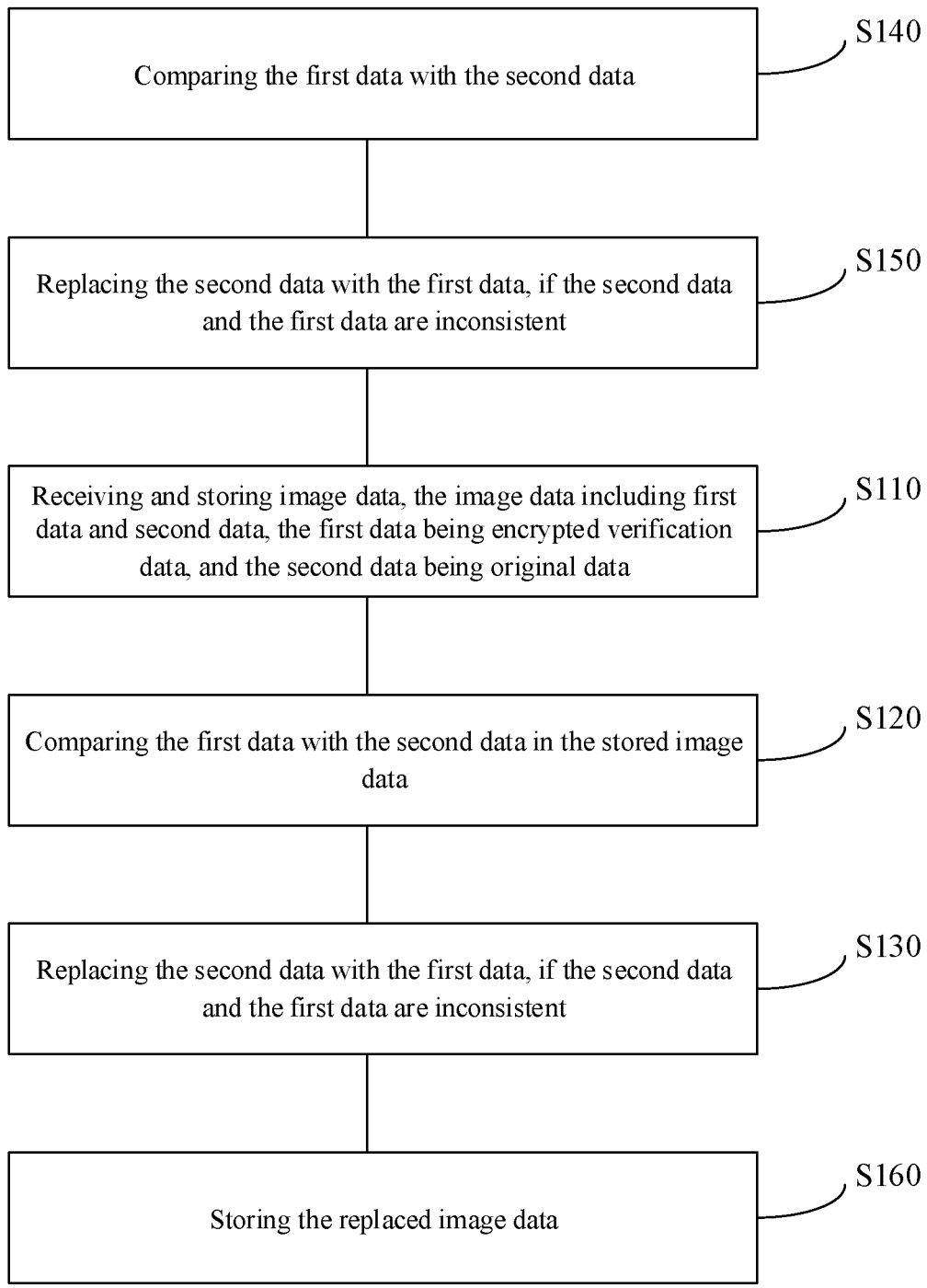
FIG. 5 is a flowchart of a third data transmission method provided by an exemplary embodiment of the present disclosure.

Further, in order to store the corrected image data when there are errors in the RAM storage unit, after Step S130, as shown in FIG. 5, the data transmission method may further include the following step.

In Step S160, the replaced image data is stored.

A backup RAM storage unit may be provided in the integrated drive circuit, and when there is a failure in the RAM storage unit, the corrected image data may be stored in the backup RAM storage unit.

In the data transmission method provided by the embodiment of the present disclosure, if there is no error in the stored image data, the image data is transmitted to the decompression unit for decompression; if there is an error in the stored image data, the image data is corrected and the corrected image data is re-stored, and then the stored corrected image data is transmitted to the decompression unit for decompression. The decompressed image data is transmitted to a timing control unit, and the timing control unit generates a driving signal according to the image data to drive the screen.

It should be noted that although the steps of the method in the present disclosure are described in a specific order in the drawings, this does not require or imply that the steps must be performed in the specific order, or all the steps shown must be performed to achieve the desired result. Additionally or alternatively, some steps may be omitted, multiple steps may be combined into one step for execution, and/or one step may be decomposed into multiple steps for execution, etc.

Figure 6:
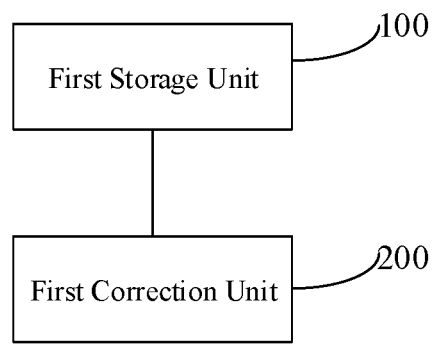
FIG. 6 is a block diagram of a first data transmission device provided by an exemplary embodiment of the present disclosure.

An embodiment of the present disclosure also provides a data transmission device. As shown in FIG. 6, the data transmission device includes: a first storage unit 100, configured to receive and store image data, wherein, the image data includes first data and second data, the first data is encrypted verification data, and the second data is original data; a first correction unit 200, connected to the first storage unit 100, and configured to compare the first data with the second data in stored image data and replace the second data with the first data, if the second data and the first data are inconsistent.

The data transmission device provided by the embodiment of the present disclosure receives and stores image data through the first storage unit 100, and compares the first data with the first data in the stored image data through the first correction unit 200 connected to the first storage unit 100. If the second data and the first data are inconsistent, the second data is replaced by the first data. The problem that there is an error in the image data due to the failure of the first storage unit 100 is solved, which in turn causes the display screen to become locally discolored, and improves the display quality.

The data transmission device provided in the embodiments of the present disclosure will be described in detail below:

The first storage unit 100 may be a RAM storage unit in a display driving integrated circuit. In actual applications, a RAM that stores image data, at an AP end of mobile phones, tablets, and other electronic devices, compresses the image data into ⅓ data by an image data compression module at the AP end. Then, the compressed image data is transmitted to an MIPI module at an end of a display driver integrated circuit through an MIPI module at the AP end. After the MIPI module receiving, the compressed image is stored in the RAM storage unit in the display drive integrated circuit.

The first correction unit 200 may include an ECC DECODER for verifying the first data and the second data in the first storage unit 100. When the second data and the first data are inconsistent, the second data is replaced by the first data.

When the first correction unit 200 verifies the first data and the second data, the first data can be decoded. The decoded first data and the second data may be compared to detect whether the second data is consistent with the decoded first data. If the second data is consistent with the decoded first data, it may be determined that there is no failure in the first storage unit 100 storing the data; if the second data and the decoded first data are inconsistent, it may be determined that there is a failure in the first storage unit 100 storing the data, and in this case, the second data is replaced by the first data to correct the image data.

It should be noted that the first data will be partially lost during the encryption and decoding process. Therefore, when comparing the first data with the second data, when a difference between the first data and the second data is within a range of partially lost data, it is determined that the first data and the second data are consistent, and there is no failure in the first storage unit that stores the image data 100, and in this case, the image data will be transferred to a decompression unit 500 for decompression; when the difference between the first data and the second data exceeds the range of the partially lost data, it is determined that the first data and the second data are inconsistent, and there is a failure in the first storage unit 100 that stores the image data, and in this case, the second data is replaced by the first data to correct the image data.

When the first correction unit 200 verifies the first data and the second data, it may also be performed by encrypting the second data and comparing the encrypted second data with the first data. The encrypted second data is compared with the first data to detect whether the encrypted second data is consistent with the first data. If the second data is consistent with the first data, it may be determined that there is no failure in the first storage unit 100 that stores the data; if the second data and the first data are inconsistent, it may be determined that there is a failure in the first storage unit 100 that stores the data, and in this case, by decoding the first data, the second data is replaced by the decoded first data to correct the image data.

Figure 7:
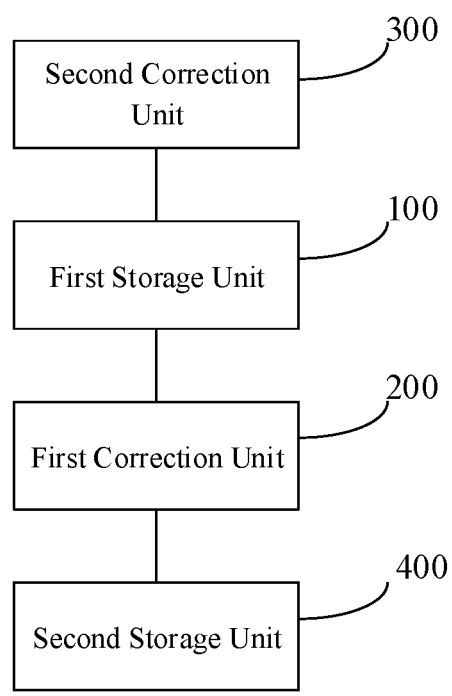
FIG. 7 is a block diagram of a second data transmission device provided by an exemplary embodiment of the present disclosure.

For further assurance, the data transmission device further includes a second correction unit 300. As shown in FIG. 7, the second correction unit 300 is connected to an input end of the first storage unit 100, and is configured to detect the first data and the second data in the image data at the input end of the first storage unit 100, that is, before the first storage unit 100 receives and stores the image data, the second correction unit 300 compares the first data with the second data, and if the second data and the first data are inconsistent, the second data is replaced by the first data.

The second correction unit 300 receives the image data of an AP end of a terminal, and verifies the image data, which avoids errors in the image data stored in the first storage unit 100 due to transmission errors. The second correction unit 300 may include:

an ECC ENCODER, configured to verify the first data and the second data at the input end of the first storage unit 100, when the second data and the first data are inconsistent, the second data is replaced by the first data.

The second correction unit 300 may adopt a method of decoding the first data and comparing the first data with the second data, because the first data may be partially lost during the encryption and decoding process. Therefore, when comparing the first data with the second data, when a difference between the first data and the second data is within a range of partially lost data, it is determined that the first data and the second data are consistent, and there is no error in the image data during transmission, and in this case, the image data will be stored in the corresponding first storage unit 100; when the difference between the first data and the second data exceeds the range of the partially lost data, it is determined that the first data and the second data are inconsistent, and there is an error in the image data during transmission, and in this case, the second data is replaced by the first data to correct the image data.

The second correction unit 300 may also adopt an encryption method to encrypt the second data, and compare the first data with the encrypted second data. Since the encryption method of the second data is the same as the encryption method of the first data, during comparison, if there is no error in the image data during transmission, the encrypted second data is consistent with the first data. Of course, in actual applications, when a difference between the first data and the second data is within an allowable error that does not affect the display effect, it may also be determined that the first data and the second data are consistent. When the first data and the second data are consistent, the image data will be transferred to the corresponding first storage unit 100; when the first data and the second data are inconsistent, there is an error in the image transmission process, and in this case, the first data is decoded and the second data is replaced by the first data to correct the image data.

Further, the data transmission device provided by the embodiment of the present disclosure further includes a second storage unit 400, which is connected to the first correction unit 200 and is configured to store the replaced image data.

Figure 9:
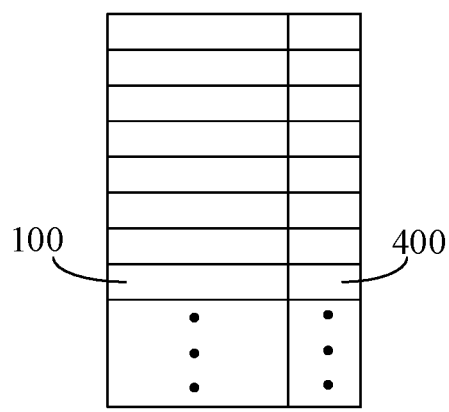
FIG. 9 is a schematic diagram of a storage unit provided by an exemplary embodiment of the present disclosure.

The second storage unit 400 is a backup RAM storage unit. When detecting that the first data and the second data are inconsistent, the first correction unit 200 indicates that there is a failure in the first storage unit 100 storing the image data. For example, when the image data is 3-bit image data, there is a failure in the first storage unit 100 storing the 3-bit data. By replacing the second data with the first data, the corrected image data is stored in a backup second storage unit 400. Structures of the first storage unit 100 and the second storage unit 400 may be as shown in FIG. 9, and the backup second storage unit corresponding to the first storage unit 100 is provided on one side thereof.

In this case, the first correction unit 200 may acquire the image data from the second storage unit 400 again to perform the above verification, and when there is no error in the image data, the image data is transmitted to the decompression unit 500 for decompression, which avoids that there is a failure in the second storage unit 400, and may cause display screen to become partially discolored.

Figure 8:
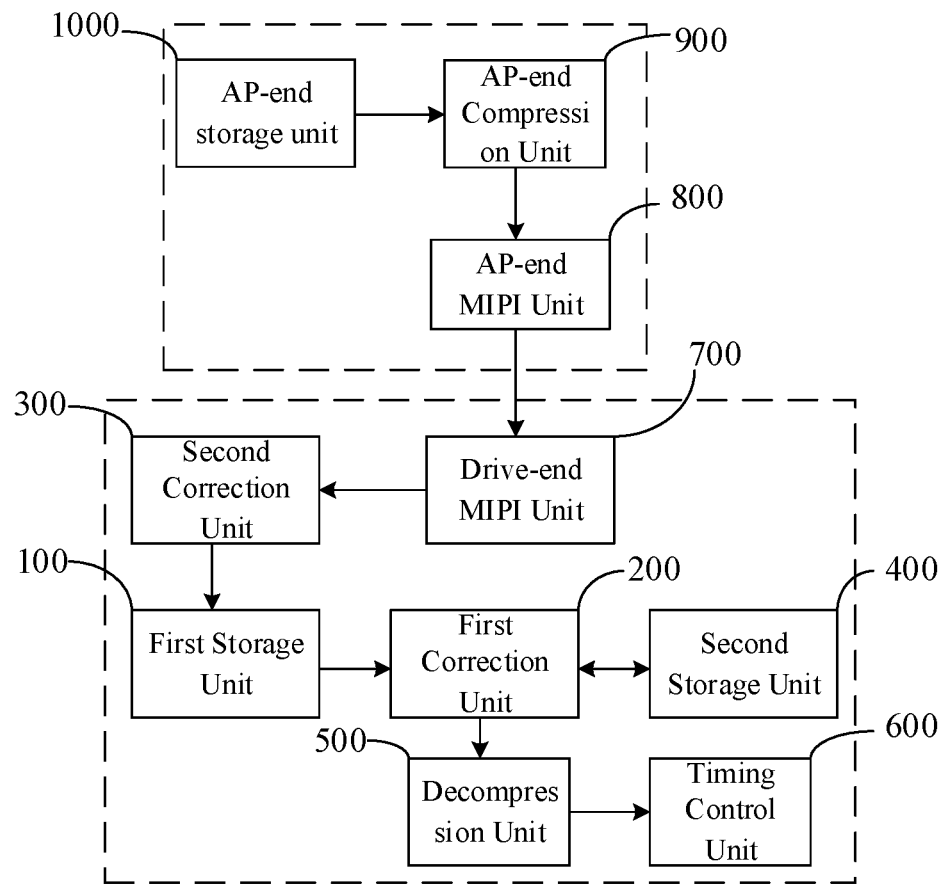
FIG. 8 is a block diagram of a third data transmission device provided by an exemplary embodiment of the present disclosure.

As shown in FIG. 8, the data transmission device provided by an embodiment of the present disclosure may further include a decompression unit 500 and a timing control unit 600. The decompression unit 500 is configured to decompress image data, and the timing control unit 600 is configured to generate a drive signal according to the image data. An AP-end compression unit 900 obtains image data from an AP-end storage unit 1000 and compresses the image data. The compressed image data is sent to a drive-end MIPI unit 700 through an AP-end MIPI (Mobile Industry Processor Interface) unit 800, and the drive-end MIPI unit 700 sends the image data to the second correction unit 300.

An embodiment of the present disclosure also provides a display device, including the above-mentioned data transmission device. In actual applications, the display device may further include a plurality of driving transistors, control switch units, and OLED array components, etc. Since they are all prior art, the embodiments of the present disclosure will not repeat them here.

The above-mentioned drawings are only schematic illustrations of the processing included in the method according to the exemplary embodiment of the present invention, and are not intended to limit the purpose. It is understood that the processes shown in the above drawings do not indicate or limit the chronological order of these processes. In addition, it is understood that these processes may be performed synchronously or asynchronously in a plurality of modules.

Those skilled in the art will easily think of other embodiments of the present disclosure after considering the description and practicing the invention disclosed herein. This application is intended to cover any variations, uses, or adaptive changes of the present disclosure that follow the general principles of the present disclosure and include common general knowledge or common technical means in the technical field not disclosed in the present disclosure. The description and examples are to be considered exemplary only, and the true scope and spirit of this disclosure are pointed out by the appended claims.

What is claimed is:

1. A data transmission device, comprising:
   a first storage unit configured to receive and store image data, wherein stored image data comprises first data and second data, the first data is encrypted verification data, and the second data is original data;
   a first correction unit connected to the first storage unit, and configured to compare the first data with the second data in the stored image data and replace the second data with the first data in an instance in which the second data and the first data are inconsistent; and
   a second correction unit connected to the first storage unit, and configured to compare the first data with the second data in the image data at an input end of the first storage unit and replace the second data with the first data in an instance in which the second data and the first data are inconsistent.

2. The data transmission device according to claim 1, wherein:
   the first correction unit comprises a first decoder configured to verify the first data and the second data in the first storage unit and replace the second data with the first data in an instance in which the second data and the first data are inconsistent; and
   the second correction unit comprises a second decoder configured to verify the first data and the second data at the input end of the first storage unit, and replace the second data with the first data in an instance in which the second data and the first data are inconsistent.

3. The data transmission device according to claim 1, wherein the data transmission device further comprises: a second storage unit connected to the first storage unit, and configured to store replaced image data.

4. A display device, comprising:
a data transmission device, comprising:
  a first storage unit configured to receive and store image data, wherein, stored image data comprises first data and second data, the first data is encrypted verification data, and the second data is original data;
  a first correction unit connected to the first storage unit, and configured to compare the first data with the second data in the stored image data and replace the second data with the first data in response to the second data and the first data being inconsistent; and
  a second correction unit connected to the first storage unit, and configured to compare the first data with the second data in the image data at an input end of the first storage unit and replace the second data with the first data in response to the second data and the first data being inconsistent.

5. The display device according to claim 4, wherein:
the first correction unit comprises a first decoder configured to verify the first data and the second data in the first storage unit and replace the second data with the first data in response to the second data and the first data being inconsistent; and
the second correction unit comprises a second decoder configured to verify the first data and the second data at the input end of the first storage unit, and replace the second data with the first data in response to the second data and the first data being inconsistent.

6. The display device according to claim 4, wherein the data transmission device further comprises a second storage unit connected to the first storage unit, and configured to store replaced image data.

7. A method, comprising:
providing a data transmission device, comprising:
  a first storage unit configured to receive and store image data, wherein, stored image data comprises first data and second data, the first data is encrypted verification data, and the second data is original data;
  a first correction unit connected to the first storage unit, and configured to compare the first data with the second data in the stored image data and replace the second data with the first data in response to the second data and the first data being inconsistent; and
  a second correction unit connected to the first storage unit, and configured to compare the first data with the second data in the image data at an input end of the first storage unit and replace the second data with the first data in response to the second data and the first data being inconsistent.

8. The method according to claim 7, wherein:
the first correction unit as provided comprises a first decoder configured to verify the first data and the second data in the first storage unit and replace the second data with the first data in response to the second data and the first data being inconsistent; and
the second correction unit and provided comprises a second decoder configured to verify the first data and the second data at the input end of the first storage unit, and replace the second data with the first data in response to the second data and the first data being inconsistent.

9. The method according to claim 8, further comprising providing a display device, wherein the display device comprises the data transmission device.

10. The method according to claim 7, wherein the data transmission device as provided further comprises a second storage unit connected to the first storage unit, and configured to store replaced image data.

11. The method according to claim 10, further comprising providing a display device, wherein the display device comprises the data transmission device.

12. The method according to claim 7, further comprising providing a display device, wherein the display device comprises the data transmission device.

* * * * *